US012499881B2

(12) United States Patent
Anderson et al.

(10) Patent No.: US 12,499,881 B2
(45) Date of Patent: Dec. 16, 2025

(54) SYSTEM AND METHOD FOR GENERATING WRAP UP INFORMATION

(71) Applicant: Verint Americas Inc., Alpharetta, GA (US)

(72) Inventors: Grant Anderson, Erskine (GB); Scott Mackie, Scotland (GB); Neil Eades, Scotland (GB); Sean Robertson, Alpharetta, GA (US)

(73) Assignee: VERINT AMERICAS INC., Alpharetta, GA (US)

( * ) Notice: Subject to any disclaimer, the term of this patent is extended or adjusted under 35 U.S.C. 154(b) by 247 days.

(21) Appl. No.: 18/096,942

(22) Filed: Jan. 13, 2023

(65) Prior Publication Data

US 2023/0230585 A1    Jul. 20, 2023

Related U.S. Application Data

(60) Provisional application No. 63/299,583, filed on Jan. 14, 2022.

(51) Int. Cl.
*G10L 15/00* (2013.01)
*G06N 3/08* (2023.01)
(Continued)

(52) U.S. Cl.
CPC .............. *G10L 15/183* (2013.01); *G06N 3/08* (2013.01); *G10L 15/063* (2013.01); *G10L 15/16* (2013.01); *G10L 15/30* (2013.01); *G10L 15/04* (2013.01)

(58) Field of Classification Search
None
See application file for complete search history.

(56) References Cited

U.S. PATENT DOCUMENTS 7,039,166 B1    5/2006  Peterson
8,644,488 B2    2/2014  Byrd
(Continued)

FOREIGN PATENT DOCUMENTS

WO    2020010930 A1    1/2020
WO    2021074798 A1    4/2021

OTHER PUBLICATIONS

"Enabling Cisco Contact Center (CCE/CCX) to route multichannel interactions to agents using Salesforce", accessible at: https://www.bucher-suter.com/wp-content/uploads/2021/09/fact-sheet-connects-for-salesforce.pdf 2022, last accessed May 1, 2023.
(Continued)

*Primary Examiner* — Satwant K Singh
(74) *Attorney, Agent, or Firm* — Dinsmore & Shohl LLP

(57) ABSTRACT

A system for generating wrap-up information is capable of learning how interactions are transformed into contact notes and outcome codes using natural language processing and can generate the contact notes and outcome codes for new incoming interactions by applying prediction models trained on interaction data, contact notes and outcome codes. The system for generating wrap-up information receives interaction data, including interaction audio data, interaction transcripts, associated contact notes and associated outcome codes. The interaction transcripts are generated from the previous interactions between agents and customers. The contact notes and outcome codes are generated by agents during the associated previous interactions. The system processes and uses the interaction data to train prediction models to analyze interaction audio data and interaction transcripts and predict appropriate contact notes and outcome codes for the interaction. Once trained the prediction model(s) can generate appropriate contact notes and outcome codes for new interactions.

20 Claims, 10 Drawing Sheets

(51) Int. Cl.
*G10L 15/06* (2013.01)
*G10L 15/16* (2006.01)
*G10L 15/183* (2013.01)
*G10L 15/30* (2013.01)
*G10L 15/04* (2013.01)

(56) References Cited

U.S. PATENT DOCUMENTS

| | | | |
|---|---|---|---|
| 10,204,641 B2 | 2/2019 | Ryan | |
| 10,965,812 B1* | 3/2021 | Das | G06F 40/216 |
| 11,410,644 B2* | 8/2022 | McCourt | G06N 5/04 |
| 11,521,601 B2* | 12/2022 | McCourt | G06F 40/258 |
| 2022/0301558 A1* | 9/2022 | Carmeli | G10L 15/1822 |
| 2022/0383863 A1* | 12/2022 | McCourt | G06N 20/00 |
| 2023/0086668 A1* | 3/2023 | Murakhovs'ka | G10L 15/22 704/235 |
| 2023/0089596 A1* | 3/2023 | Huffman | G10L 15/083 704/9 |
| 2023/0090924 A1* | 3/2023 | Mao | H04L 51/02 704/9 |
| 2023/0092702 A1* | 3/2023 | Mao | G06F 16/383 704/9 |

OTHER PUBLICATIONS

"Administering Oracle CRM on Demand" accessible at: https://docs.oracle.com/cd/E71332_01/local/pdf/enu_part2.pdf; Jun. 2016, last accessed May 1, 2023.

"Oracle CRM On Demand—Computer Telephony Integration for Avaya" accessible at: https://www.slideshare.net/CrmitCorp/oracle-fusion-crm-computer-telephony-integration-for-avaya; Feb. 22, 2013, last accessed May 4, 2023.

International Search Report and Written Opinion issued from the International Bureau of WIPO on Apr. 21, 2023, in connection with corresponding application PCT/US2023/010795.

Ankit Patil et al: "Using Natural Language Processing to Understand Reasons and Motivators Behind Customer Calls in Financial Domain", arxiv.org, Cornell University Library, 201 Olin Library Cornell University Ithaca, NY 14853, Oct. 18, 2021.

Charte Francisco et al: "Resampling Multilabel Datasets by Decoupling Highly Imbalanced Labels", May 29, 2015 (May 29, 2015), Advances in Visual Computing: 16th International Symposium, ISVC 2021, Virtual Event, Oct. 4-6, 2021, Proceedings, Part II; [Lecture Notes in Computer Science], Springer International Publishing, Cham, pp. 489-501, [retrieved on May 29, 2015] section 2.2.

M. Koziarski: "Csmoute: Combined Synthetic Oversampling and Undersampling Technique for Imbalanced Data Classification", arxiv.org, Cornell University Library, 201 Olin Library Cornell University Ithaca, NY 14853, Apr. 7, 2020, sections I & II.

International Preliminary Report on Patentability issued on Jul. 25, 2024 by the International Bureau of WIPO.

* cited by examiner

SYSTEM AND METHOD FOR GENERATING WRAP UP INFORMATION

CROSS-REFERENCE TO RELATED APPLICATIONS

The present application claims priority of U.S. Provisional Patent Application No. 63/299,583, filed Jan. 14, 2022, the content of which is incorporated herein by reference in its entirety.

FIELD

The present disclosure is directed to generating wrap up information for a customer interaction session in a customer engagement system.

BACKGROUND

In a customer engagement center (CEC), interactions take place between agents and customers looking for help with various issues. The agents may take some form of action on the customer's behalf to assist with resolving their issue. Many CECs find it beneficial to keep a record of the outcomes of the interactions and generate notes and data pertaining to the interaction to ensure a clear understanding of the interaction and the outcomes at a later time.

In conventional approaches, CEC systems rely on agents to manually develop the notes and data pertaining to the interaction (for example, the agent manually assigns outcome codes and manually writes wrap-up notes for the interaction). The data generated for the system may include categorization details for the interaction pertaining to the type of interaction, the actions taken by the agent as a result of the interaction, etc. Further, the agent will typically be required to compose notes for the interaction, which is often time consuming and detracts from the agent's ability to assist with other customers. Errors and inconsistencies in the contact notes and categorization due to agent entry may limit their later utility.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, according to certain embodiments a method is disclosed that includes receiving historical interaction data from an interaction database. The method includes generating training data from the historical interaction data including generating training transcripts from historical recordings in the historical interaction data. The method includes building a vocabulary of words in the training transcripts and converting the vocabulary to integer IDs. The method includes generating vector embeddings for the vocabulary. The method includes converting the training transcripts and training contact notes associated with each of the training data to integer sequences based on the integer IDs for the vocabulary. The method includes converting training outcome codes associated with each of the training transcripts to a binarized label. The method includes training a predictive note model with the vector embeddings, the integer sequences for the training transcripts, and the integer sequences for the training contact notes. The method includes training a predictive code model with the integer sequences for the training transcripts, the vector embeddings, and the binarized labels for the training outcome codes. The method includes passing an integer sequence for a communication transcript to the predictive code model and the predictive note model. The method includes generating one or more outcome codes for the communication transcript using the predictive code model. The method includes generating a contact note for the communication transcript using the predictive note model.

Other embodiments provide processing systems configured to perform the aforementioned methods as well as those described herein; non-transitory computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The objects and advantages will appear more fully from the following detailed description made in conjunction with the accompanying drawings.

BRIEF DESCRIPTION OF THE DRAWING(S)

Figure 1A:
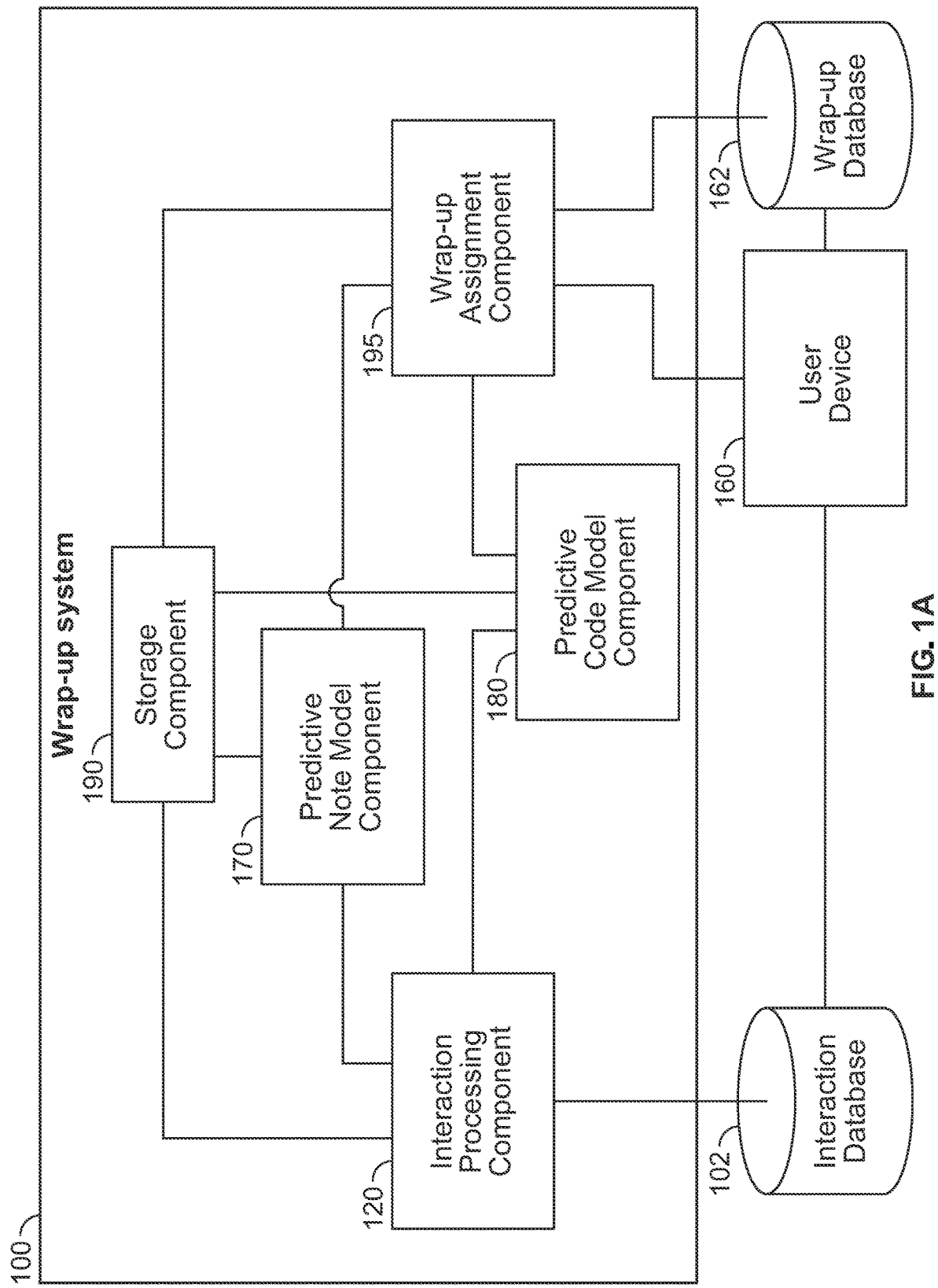
FIG. 1A depicts an example of a system for auto-generating wrap up information for an interaction, according to certain embodiments.

It should be understood that for clarity, not every part is necessarily labeled in every drawing. Lack of labeling should not be interpreted as a lack of disclosure.

DETAILED DESCRIPTION

In the present description, certain terms have been used for brevity, clearness, and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Dimensions and materials identified in the drawings and applications are by way of example only and are not intended to limit the scope of the claimed invention. Any other dimensions and materials not consistent with the purpose of the present application can also be used. Various equivalents, alternatives, and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

There is an unmet need in the art for a system capable of automatedly predicting outcome codes (also referred to as labels) for labeling customer service interactions between an agent and a customer using machine learning. There is a further unmet need in the art for a system capable of analyzing the interactions between the agent and the customer, determining contact notes, training a prediction model on the determined contact notes to predict contact notes for future interactions, and continuously or intermittently improving the predicted contact notes for incoming interactions.

A system for generating wrap-up information is capable of learning how interactions are transformed into contact notes and outcome codes using natural language processing and can generate the contact notes and outcome codes for new incoming interactions by applying prediction models trained on interaction data, contact notes and outcome codes. Accordingly, the present disclosure overcomes the problems with conventional approaches of manually generating contact notes and outcome codes by teaching the system with the method to learn the link between transcribed interactions, outcome codes and wrap-up notes, and subsequently suggest appropriate outcome codes and wrap-up notes for new interactions.

The system for generating wrap-up information receives interaction data, including interaction audio data, interaction transcripts, associated contact notes and associated outcome codes. The interaction transcripts are generated from the previous interactions between agents and customers. The contact notes and outcome codes are generated by agents during the associated previous interactions. The system processes and uses the interaction data to train prediction models to analyze interaction audio data and interaction transcripts and predict appropriate contact notes and outcome codes for the interaction. Once trained the prediction model(s) can generate appropriate contact notes and outcome codes for new interactions. Contact notes may include data such as, but not limited to, a summarization of the interaction, sentiment data for the parties in the interaction (e.g., voice tone and attitude), or a description of subsequent actions to be taken. Outcome codes include predetermined tags or labels that categorize the interaction. By way of non-limiting example, an interaction in which a contact utters obscenities and threats may have the wrap-up note "Call ended due to obscene language and threats of physical harm" and the outcome codes "Call ended by agent," "Call included threatening language," and "Call included obscene language."

Figure 1B:
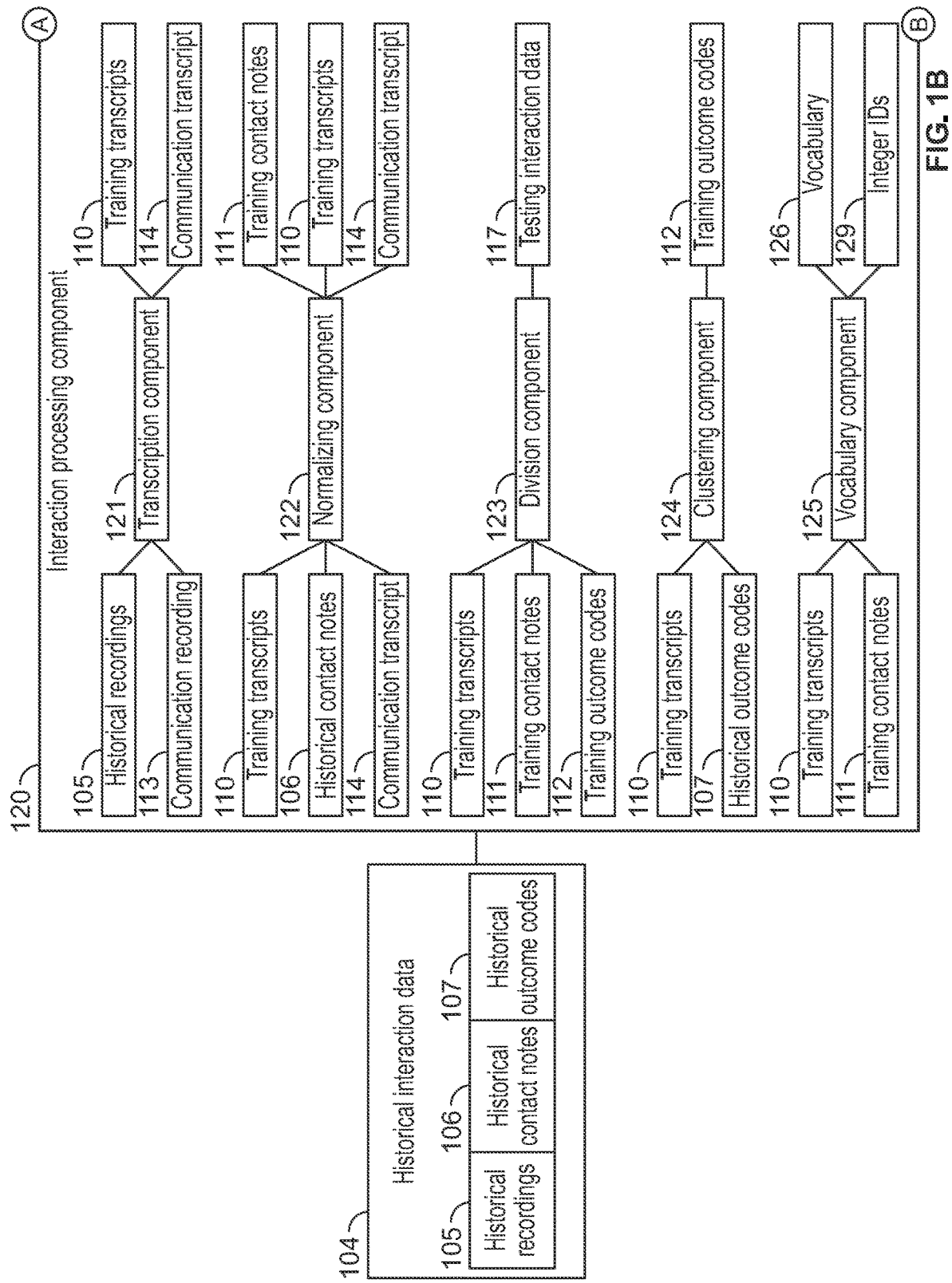
FIG. 1B depicts an example of a preprocessing component used in the wrap-up system, according to certain embodiments.
Figure 1B:
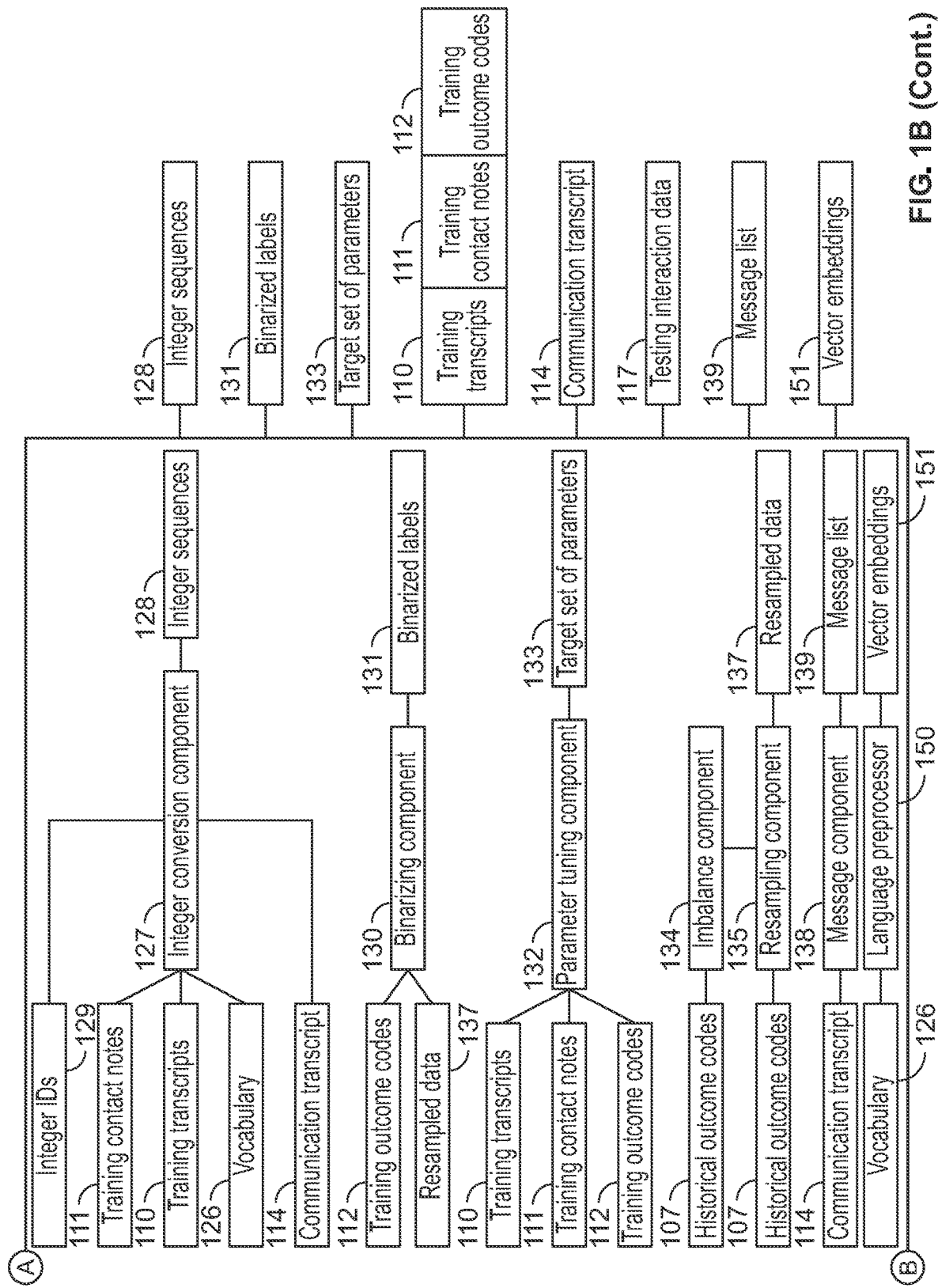

FIG. 1A depicts an example of a wrap-up system 100 for auto-generating wrap up information for a customer interaction, according to certain embodiments. FIG. 1B depicts an example of an interaction processing component 120 used in the wrap-up system 100, according to certain embodiments.

In an embodiment, the wrap-up system 100 may be part of a customer service center system (not shown) or may be a separate component integrated with the customer service center system or any other company system that stores interaction data from interactions between customers and customer service agents. The wrap-up system 100 interacts with an interaction database 102 to receive historical interaction data 104 to train predictive note model(s) and predictive code model(s). The wrap-up system 100 includes an interaction processing component 120 to generate training interaction data which includes training transcripts 110, training contact notes 111, and training outcome codes 112, a predictive note model component 170 to train and update predictive note model(s) for generating contact notes for new interactions, a predictive code model component 180 to train and update predictive code model(s) for generating outcome codes for new interactions, and a wrap-up assignment component 195 for presenting generated outcome codes and contact notes to users for approval. Each of these components will be described in greater detail below. Users may interact with the wrap-up system 100. The wrap-up system 100 optionally includes one or more user devices 160 useable by users for interaction with the wrap-up system 100 and for viewing generated contact notes and outcome codes for new interactions. In an embodiment, the wrap-up system 100 may be a processor(s) or a combination of a processing system and a storage system with a software component and optional storage.

In an example as described in further detail herein, historical interaction data 104 may comprise a plurality of historical recordings 105 of customer service interactions, such as the text of web chats or messaging, or audio data from telephone calls. The historical interaction data 104 may also include a plurality of historical contact notes 106 and a plurality of historical outcome codes 107 generated by agents and associated with the historical recordings 105. The customer service interactions, whether text- or audio-based, may occur and be recorded in parallel such that multiple customer service interactions are ongoing at any one time, such as at a CEC or multiple independent and decentralized agents acting at the same time. In an embodiment, each historical interaction data 104 includes a historical recording 105 of the interaction, one or more historical contact note 106 for the interaction, and one or more historical outcome code 107 for the interaction. In an embodiment, each historical interaction data 104 may be represented as a data structure including fields for all associated information and data associated with the historical interaction data. In an embodiment, each historical interaction data 104 may be represented as an object, including attributes for all associated information and data associated with the historical interaction data. It should be understood that these are merely examples and that any appropriate structure for associating the data for the historical interaction data 104 may be used.

In an embodiment, the historical recordings 105 are the recorded interactions between customers and customer service agents. The historical recordings 105 may be in the form of audio data or textual data depending on the format of the interaction. In an embodiment, the historical contact notes 106 are textual data associated with the historical recordings 105 that summarize or describe the interaction and/or summarize or describe actions to be taken based on the interaction. In an embodiment, the historical outcome codes 107 are tags or labels categorizing the interaction and/or categorizing actions to be taken based on the interaction. It should be understood that while historical interaction data 104 is described as including several types of data (e.g., historical recordings 105, historical contact notes 106, and historical outcome codes) that each historical interaction data and its data parts are associated with a specific interaction and remain associated with the specific interaction and each other throughout processing. It should be further understood that this applies to later described training data including training transcripts 110, training contact notes 111, and training outcome codes 112.

The wrap-up system 100 includes an interaction processing component 120 to receive historical interaction data 104 from the interaction database 102. The interaction processing component 120 performs multiple preprocessing procedures (described in further detail herein) on the historical interaction data 104 using various components to create training interaction data. The training interaction data includes a plurality of training transcripts 110, a plurality of training contact notes 111, and a plurality of training outcome codes 112. In an embodiment, the interaction processing component 120 receives all historical interaction data 104 available. In an embodiment, the wrap-up system 100 and/or a user may request and/or query the interaction database 102 for the desired historical interaction data 104. The request and/or query may be based on a number of factors, including, but not limited to, time periods, system outcomes, previous outcomes, deleted outcomes, etc.

The interaction processing component 120 may also process communication interaction data, specifically communication recordings 113 and communication transcripts 114, to allow the system to generate contact notes and outcome codes for the communication interaction data. In an embodiment, communication interaction data is data from interactions between customers and customer service agents for which the wrap-up system will generate predicted contact notes and outcome codes. In a non-limiting example, the communication interaction data may include new interactions that do not have associated outcome codes or contact notes. In another non-limiting example, the communication interaction data may include historical interactions or other interactions that already have associated contact notes and outcome codes and the predicted contact notes and outcome codes may be used to text the accuracy of the training of the predictive note model(s) and the predictive code model(s).

The interaction processing component 120 extracts training interaction data from the historical interaction data 104 using a transcription component 121. The transcription component 121 may perform segmentation of the historical recordings 105, followed by a large vocabulary continuous speech recognition (LVCSR) transcription to create the training transcripts 110. In certain embodiments, the transcription component 121 may segment the historical recordings 105 into a series of utterances, which are segments of audio data that are likely to be speech separated by segments of audio data that are likely to be non-speech segments such as silence or non-speech noise that exceed a threshold amount of time, for example, 3 seconds. In certain embodiments, the LVCSR may be specialized for words, phrases, and terms in a specific industry, technical, or scientific field, specific to a language or a dialect, or expected in the historical interaction data 104 to ensure that the proper terms and interpretations are prioritized. The transcription component 121 may also extract communication transcripts 114 from communication recordings 113 using the above process.

The interaction processing component 120 may normalize the historical recordings 105, historical contact notes 106, and training transcripts 110 using a normalizing component 122. The normalizing component 122 removes punctuation and markups to render the training transcripts 110 and training contact notes 111 in a standard format. In one embodiment, the normalization includes: removing markups, removing system messages, converting to lowercase, removing participant names, expanding contractions, removing punctuation and whitespace, removing stop words (from historical recordings 105 and training transcripts 110), setting an individual maximum length for both training transcripts 110 and training contact notes 111 based on the maximum length of existing training transcripts 110 and training contact notes 111, and appending special indicators to training contact notes 111 indicating the start and end of each training contact note 111. The transcription component 121 may also normalize communication transcripts 114 using the above process.

The interaction processing component 120 may utilize a division component 123 to split off testing interaction data 117 from the training data, including a subset of the training transcripts 110, training contact notes 111, and training outcome codes 112 from the training interaction data. The division component 123 may select the testing interaction data 117 randomly, or from a predetermined percentage or amount of training data including the training transcripts 110, training contact notes 111, and training outcome codes 112. The testing interaction data 117 may be used to test trained models with "new" interaction data that has contact notes and outcome codes already associated with the "new" interaction data. In embodiments involving splitting off outcome codes where each sample may have more than one label, keeping the same outcome code distribution for the testing data and the training data is desired. In those embodiments, the division component 123 may use a splitting algorithm intended to maintain the distribution throughout the data sets. One such appropriate algorithm is the iterative_train_test_split function from scikit-multilearn. This is merely one example algorithm and should not be considered limiting. In embodiments without multi-label samples traditional split algorithms may be used.

The interaction processing component 120 may utilize a clustering component 124 to assign new training outcome codes 112 to the historical recordings 105. Clustering the historical data will identify historical outcome codes 107 and examine performance across the historical outcome codes 107. In certain embodiments, the clustering component 124 utilizes a k-means clustering algorithm that may be an unsupervised, semi-supervised, or supervised k-means technique. Other embodiments may use other unsupervised, semi-supervised, or supervised algorithms such as, but not limited to, density-based spatial clustering of applications with noise (DBSCAN) or hierarchical clustering. In embodiments that do not use clustering, historical outcome codes 107 will simply be used as training outcome codes 112.

The interaction processing component 120 may utilize a vocabulary component 125 to build a vocabulary 126 from both the training transcripts 110 and the training contact notes 111. The vocabulary component 125 builds the vocabulary 126 to cover the words used in the training transcripts 110 and training contact notes 111. In certain embodiments, the vocabulary component 125 is a tokenizer. One such applicable tokenizer uses Tensorflow and Keras. It should be understood that this is merely an example of a tokenizer and should not be considered limiting. In an embodiment, the vocabulary 126 has a maximum size which may be determined by the tokenizer used or may be user determined.

The interaction processing component 120 may utilize an integer conversion component 127 to convert the training transcripts 110, and the training contact notes 111 to integer sequences 128. Each word in the vocabulary 126 is assigned an integer ID 129 using the vocabulary component 125. The integer conversion component 127 uses the integer IDs 129 to convert the text of both the training transcripts 110 and the training contact notes 111 to integer sequences 128, sequences which can be processed by a model. The integer conversion component 127 may also convert communication transcripts 114 using the above process. In an embodiment, the integer conversion component 127 may use the tokenizer described above for the integer conversion. Further, it should be understood that the integer conversion may occur in conjunction with the vocabulary 126 being built.

The interaction processing component 120 may utilize a binarizing component 130 to convert the training outcome codes 112 (for model training) to binarized labels 131, binary representations which can be processed by a model. In certain embodiments, the binarizing component 130 is a multilabel binarizer. One such applicable multilabel binarizer is MultiLableBinarizer from scikit-learn. It should be understood that this is merely an example of a multilabel binarizer and should not be considered limiting.

The interaction processing component 120 may utilize a parameter tuning component 132 to find the best set of parameters from the training interaction data. A different model may have different parameters, which should be tuned to provide optimum model training. The parameter tuning component 132 runs a parameter tuning algorithm to select a target set of parameters 133 and data from the training transcripts 110, training contact notes 111, and training outcome codes 112. As indicated, different models may be optimized based on different parameters, in embodiments, the parameter tuning algorithm for the predictive code model may be the Hyperband parameter tuning algorithm provided in the kerastuner package. The parameters for the Hyperband parameter tuning algorithm may be set by the user.

The interaction processing component 120 may utilize an imbalance component 134 to determine if the training data is imbalanced. Based on the distribution of the historical outcome codes 107, the imbalance component 134 calculates a mean imbalance ratio, an imbalance ratio per outcome code, and a coefficient of variation of the imbalance ratio per outcome code. If these values are above a specific threshold, the interaction processing component 120 subjects the historical outcome codes 107 to resampling to balance the distribution of outcome codes.

The interaction processing component 120 may utilize a resampling component 135 to resample imbalanced data. The resampling component 135 utilizes at least one resampling algorithm to create equality across various sets of historical outcome codes 107. In various embodiments, the resampling algorithm may be a Label Powerset Random Undersampling (LP-RUS) algorithm, a Label Powerset Random Oversampling (LP-ROS) algorithm, a Multilabel Random Undersampling (ML-RUS) algorithm, a Multilabel Random Oversampling (ML-ROS) algorithm, or any combination thereof. The RUS and ROS algorithms resample by considering the historical outcome codes 107 of the dataset, with RUS algorithms eliminating instances that appear more frequently in the outcome code sets and ROS algorithms replicating instances that appear less frequently in the outcome code sets. The resampled historical outcome codes 107 generate resampled data 137, which may then be passed for further processing as training outcome codes 112.

The interaction processing component 120 may utilize a message component 138 to generate a message list 139. The message component 138 creates the message list 139 from multiple portions of the communication transcript 114. The message list 139 is utilized by the predictive code model to generate the outcome codes.

The interaction processing component 120 may utilize a language preprocessor 150 to encode the vocabulary 126. The language preprocessor 150 transforms the vocabulary 126 into a plurality of vector embeddings 151. In an embodiment, the language preprocessor 150 transformer deep learning model including, but not limited to autoencoding language models, autoregressive language models, encoder-decoder language models. In an embodiment, the language preprocessor 150 is one of Generative Pre-trained Transformer 2 (GPT-2), Generative Pre-trained Transformer 3 (GPT-3), Bidirectional Encoder Representations from Transformers (BERT), XLNet, ELECTRA, ALBERT, DistilBERT, and ROBERTa. In another embodiment, the language preprocessor 150 may be BERT-as-service, run either locally or remotely. In another embodiment, the language preprocessor 150 may be BERT-as-service run on a graphics processing unit (GPU) capable of running a TensorFlow open-source software library.

It should be understood that the encoding of the domain language of the CEC system is optional and that a pre-trained language processing component 150 may be used to generate the vector embeddings. However, the fine-tuning of a pre-trained language processing component 150 on the specific domain will result in a more accurate prediction of contact notes and applicable outcome codes. In embodiments using a pre-trained language processing component 150, the vocabulary 126 does not need to be encoded prior to predicting outcome codes and contact notes.

The wrap-up system 100 further includes a predictive note model component 170, which receives the integer sequences 128 and vector embeddings 151. The predictive note model component 170 receives integer sequences 128 for training interaction date including training transcripts 110 and training contact notes 111 to train a predictive note model to predict appropriate contact notes for interactions. Once trained with training interaction data, the predicted note model component receives integer sequences 128 for transcripts from interactions to generate contact notes for the interactions. In an embodiment, the predictive code model component 180 receives integer sequences 128 for communication transcripts 114 for predicting contact notes. The trained predictive note model can generate contact notes for a communication transcript 114. In one embodiment, the predictive code model component 180 receives integer sequences 128 from transcripts for testing interaction data 117 to predicting contact notes. The trained predictive note models can generate contact notes for the transcripts of the testing interaction data 117.

In one embodiment, the predictive note model is a sequence-to-sequence model which may include encoder-decoder models with attention. In various embodiments, the sequence-to-sequence model may include unsupervised models (e.g., n-gram embeddings, skip-thought vectors, Word Mover's Embedding, SBERT) and supervised models (e.g., Generative Pre-trained Transformer, Deep Semantic Similarity Model, Universal Sentence Encoder). In an embodiment, the sequence-to-sequence model may be a BERT text summarization with pre-trained encoder (also known as a pre-trained BERTSUM or PreSumm). It should be understood that dependent on the model used some training parameters may be set by the user, such as, but not limited to the maximum number of epochs, the performance metrics to monitor, and the number of epochs to wait before stopping where no performance improvements are made.

The wrap-up system 100 further includes a predictive code model component 180, which receives the integer sequences 128, vector embeddings 151, and binarized labels 131. The predictive code model component 180 receives integer sequences 128 for training interaction data including training transcripts 110 and training outcome codes 112 to train a predictive code model to predict outcome codes for interactions. Once trained the predictive code model component 180 receives integer sequences 128 for transcripts from interactions to generate outcome codes for the interactions. In an embodiment the predictive code model component 180 receives integer sequences 128 for communication transcripts 114 to predicting outcome codes. The trained predictive code model can generate outcome codes based on the message list 139 for a communication transcript 114. In an embodiment, the predictive code model component 180 receives integer sequences 128 for transcripts from testing interaction data 117 to predict outcome codes. The trained predictive code model(s) can generate outcome codes based on the message list 139 for the transcripts of the testing interaction data 117.

In one embodiment, the predictive code model is a deep learning model or a statistical model. In various embodiments, the deep learning model is a Recurrent Neural Network (RNN) based model or a Transformer based model. In an embodiment, the statistical model utilizes a Multi-Label K-Nearest Neighbor (ML-KNN) algorithm. It should be understood that dependent on the model used some training parameters may be set by the user, such as, but not limited to the maximum number of epochs, the performance metrics to monitor, and the number of epochs to wait before stopping where no performance improvements are made.

The wrap-up system includes a wrap-up assignment component 195 for assigning and/or presenting generated contact notes and generated outcome codes to communication data including communication recordings 113. The wrap-up assignment component 195 receives communication transcripts 114 from the predictive note model component 170 along with the generated contact notes and corresponding communication recordings 113 from the interaction processing component 120. The wrap-up component also receives the same communication transcripts 114 from the predictive code model component 180 along with the generated outcome codes for the communication transcripts. In an embodiment the wrap-up assignment component 195 automatically assigns the generated contact notes and generated outcome codes to the communication recording 113 corresponding to the communication transcript 114 for which the outcome codes and contact notes were generated. The wrap-up assignment component may then display the contact data including the communication transcript 114, assigned contact notes, and assigned outcome codes on a user device 160 for review and/or store the contact data including the communication recording 113, the communication transcript 114, assigned contact notes, and assigned outcome codes in a wrap-up database 162 for later review and analysis.

In an embodiment, rather than automatedly assigning the generated contact notes and outcome codes to the communication recording 113, the wrap-up assignment component 195 displays the suggested communication data including the communication transcript 114, the generated contact notes, and generated outcome codes on a user device 160 for approval and/or editing by a customer service agent. In this embodiment, the wrap-up assignment component 195 provides options to the customer service agent to accept the generated outcome codes and/or wrap-up notes or reject the generated outcome codes and/or wrap-up notes. If the customer service agent accepts the outcome codes and/or wrap-up notes the wrap-up assignment component 195 assigns them to the communication recording as described above. If the customer service agent rejects the contact notes and/or outcome codes, the wrap-up assignment component 195 allows the customer service agent to edit, change and modify the generated contact notes and/or outcome codes prior to assigning them to the communication recording 113 as described above.

In an embodiment, the wrap-up assignment component 195 can trigger retraining of the predictive code model(s) and/or retraining of the predictive note models. In an embodiment, if the customer service agents reject generated outcome codes above a threshold amount (e.g., 50% rejection, 60% rejection, etc.) a retraining of the predictive code model(s) is triggered using updated historical interaction data 104 for training. In an embodiment, if the customer service agents reject generated contact notes above a threshold amount (e.g., 50% rejection, 60% rejection, etc.) a retraining of the predictive note model(s) is triggered using updated historical interaction data 103 for training.

In an embodiment, the wrap-up assignment component 195 receives testing interaction data 117 from the interaction processing component 120 and contact notes and outcome codes generated by the predictive note model component 170 and the predictive code model component 180 corresponding to the testing interaction data. The wrap-up assignment component 195 compares the generated contact notes for each testing interaction data 117 to the historical contact notes 106 already associated with the testing interaction data 117 to score the accuracy of the predictive note model. If the accuracy of the predictive note model is under an accuracy threshold (e.g., 75% accurate, 85% accurate, etc.) a retraining of the predictive note model is triggered using updated historical interaction data 104 for training. The wrap-up component also compares the generated outcome codes for each testing interaction data 117 to the historical outcome codes 107 already associated with the testing interaction data 117 to score the accuracy of the predictive code model. If the accuracy of the predictive code model is under an accuracy threshold (e.g., 75% accurate, 85% accurate, etc.) a retraining of the predictive code model is triggered using updated historical interaction data 104 for training.

It should further be understood that the predictive code model(s) and predictive note model(s) may be periodically or continuously retrained or updated based on the receipt of new historical interaction data 104 regardless of accuracy threshold scores or threshold amount scores determined by the wrap-up assignment component 195.

The historical interaction data 104, historical recordings 105, historical contact notes 106, historical outcome codes 107, training transcripts 110, training contact notes 111, training outcome codes 112, contact data, communication recordings 113, communication transcripts 114, test interaction data 117, vocabulary 126, integer sequences 128, integer IDs 129, binarized labels 131, target set of parameters 133, baseline models 136, resampled data 137, message list 139, vector embeddings 151, predictive note model(s), predictive code model(s), generated contact notes, generated outcome codes, threshold scores, and/or threshold accuracy scores may be stored in a storage component 190 for later use.

Figure 2A:
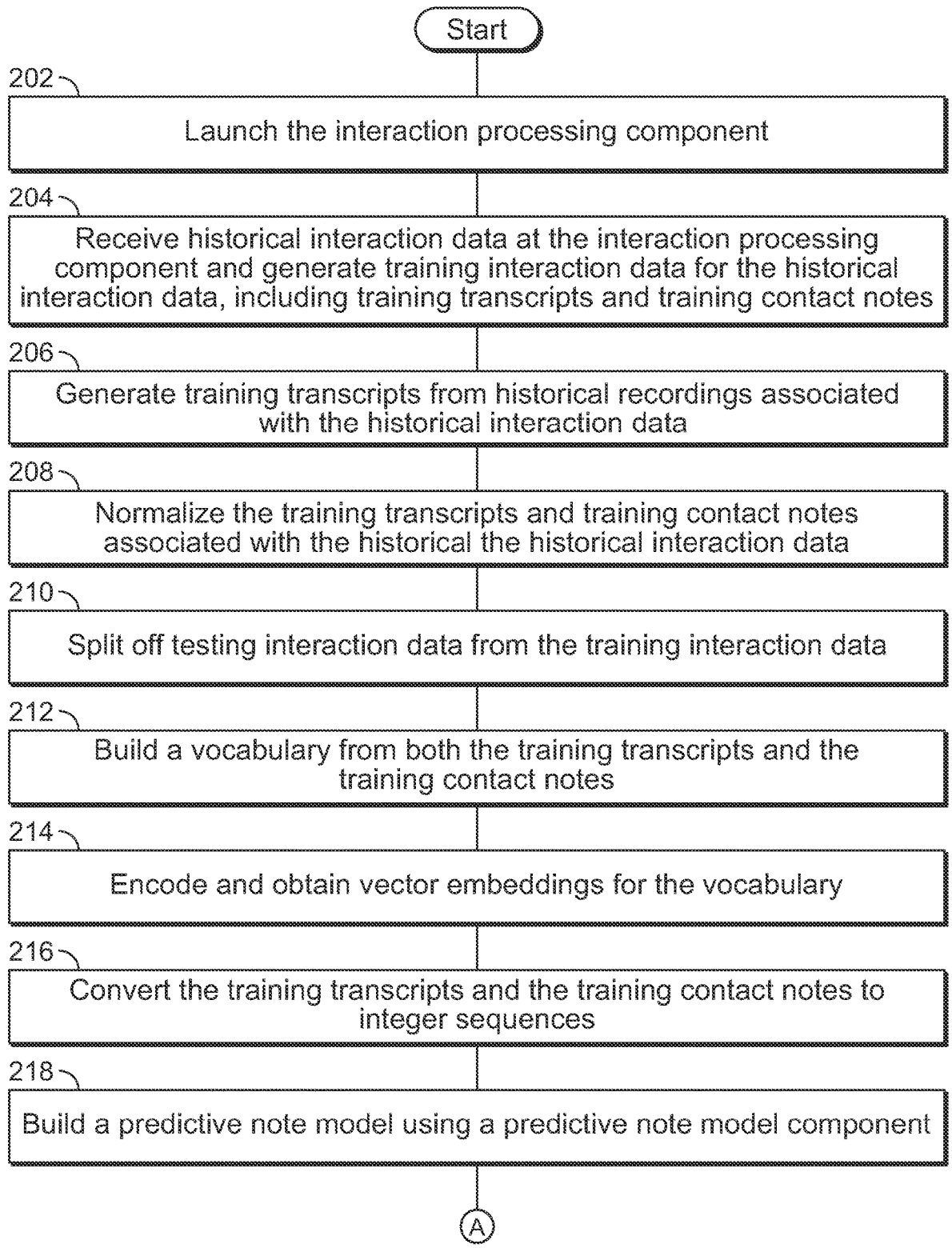
FIGS. 2A and 2B depict a flowchart of an example of a method for auto-generating wrap-up notes for an interaction, according to certain embodiments.
Figure 2B:
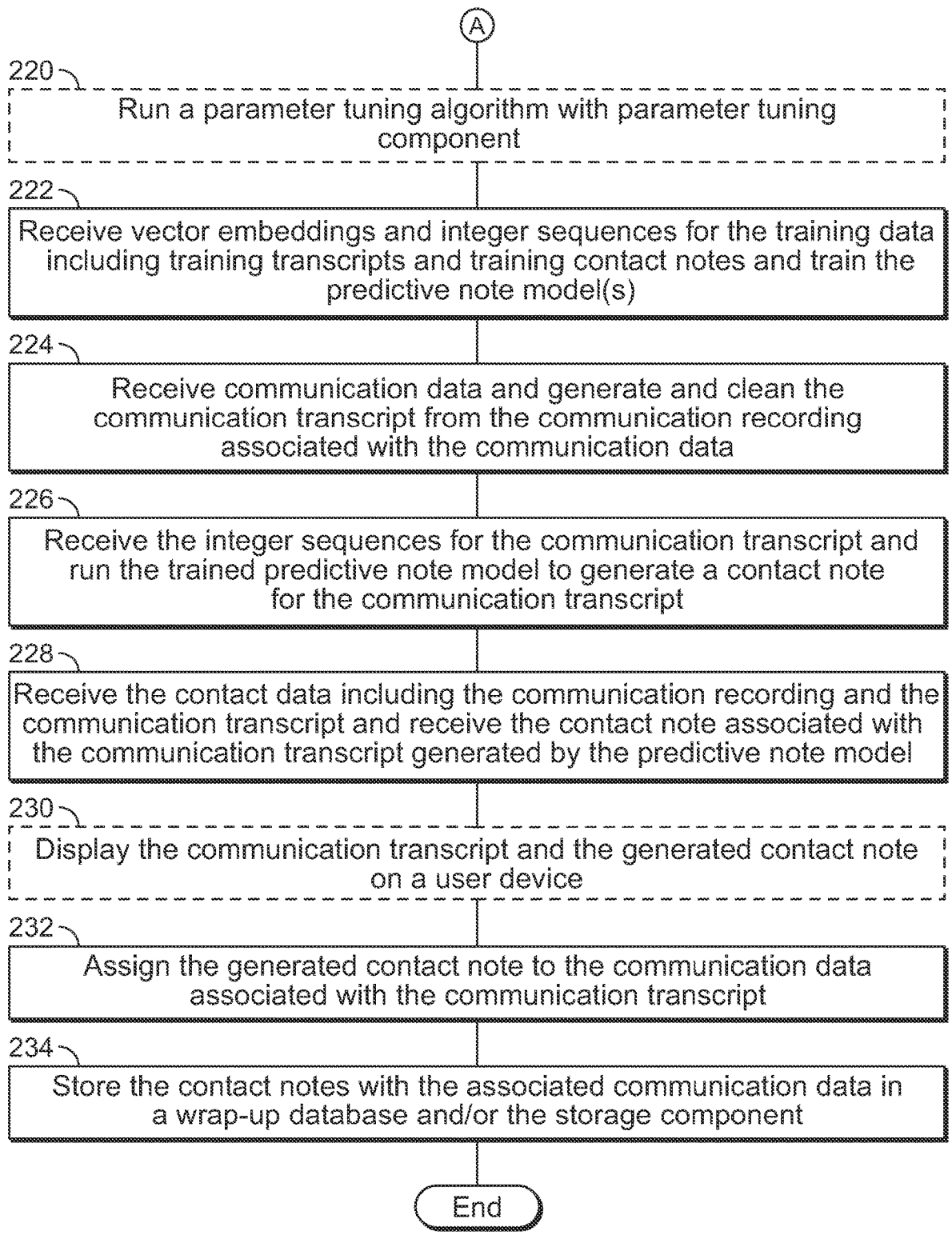

FIGS. 2A and 2B depict an example of a method 200 for auto-generating contact notes for an interaction. Blocks 202 through 216 form the data preprocessing blocks. Blocks 218 through 222 form the training blocks. Blocks 224 through 234 form the model application blocks. The numbering and sequencing of the blocks are for reference only; blocks or sequences of blocks may be performed out of order or repeated.

In block 202, the wrap-up system 100 launches the interaction processing component 120. The interaction processing component 120 is launched before or simultaneously with when historical interaction data 104 is received.

In block 204, the wrap-up system 100 receives historical interaction data 104 from an interaction database 102 or in real-time from the customer engagement center system at the interaction processing component 120 and generates training interaction data for the historical interaction data 104 including training transcripts 110 and training contact notes 111.

In block 206, the interaction processing component uses a transcription component 121 and generates training transcripts 110 from the historical recordings 105 associated with the historical interaction data 104. In certain embodiments, the transcription component 121 may segment the historical recordings 105 into a series of utterances, which are segments of audio data that are likely to be speech separated by segments of audio data that are likely to be non-speech segments such as silence or non-speech noise that exceed a threshold amount of time, for example, 3 seconds. In certain embodiments, the LVCSR may be specialized for words, phrases, and terms in a specific industry, technical, or scientific field, specific to a language or a dialect, or expected in the historical interaction data 104 to ensure that the proper terms and interpretations are prioritized. In an embodiment, the generated training transcripts 110 may be generated from historical interaction data 104 received in real-time or from historical interaction data 104 from a certain timeframe, locale, or other desired parameter or parameters.

In block 208, the interaction processing component 120, normalizes the training transcripts 110 and training contact notes 111 associated with the historical contact notes 106 of the historical interaction data 104 using a normalizing component 122. In an embodiment, the normalizing component 122 removes punctuation and markups in the training transcripts 110 and training contact notes 111 to create a standard format.

In optional block 210, the interaction processing component 120, using a division component 123, splits off testing interaction data 117 from the training interaction data. In an embodiment, to ensure the trained model(s) appropriately generalizes to unseen cases, the interaction processing component splits off testing interaction data 117, including testing transcripts and testing contact notes from the training interaction data, including training transcripts 110 and training contact notes 111. The model will not be given the testing interaction data 117 during training. Instead, the testing interaction data 117 can be used later to evaluate the performance of the trained model.

In block 212, the interaction processing component 120, using a vocabulary component 125, builds a vocabulary 126 from both the training transcripts 110 and the training contact notes 111. In certain embodiments, the vocabulary component 125 uses a tokenizer to build the vocabulary to cover the most used words in the training transcripts 110 and the training contact notes 111.

In block 214, the interaction processing component 120 uses a language preprocessor 150 to encode and obtain vector embeddings 151 for the vocabulary 126. The language preprocessor transforms the vocabulary 126 into vector embeddings 151. In an embodiment, the language preprocessor may be a Bidirectional Encoder Representations from Transformers (BERT). In another embodiment, the language preprocessor may be BERT-as-service, run either locally or remotely. In another embodiment, the BERT-as-service may be run on a graphics processing unit (GPU) capable of running the TensorFlow open-source software library.

In block 216, the interaction processing component 120, using an integer conversion component 127, converts the training transcripts 110 and the training contact notes 111 to integer sequences 128. Each word in the vocabulary 126 is assigned an integer ID 129 and the integer conversion component 127 converts the text of both the training transcripts 110 and the training contact notes 111 to integer sequences 128 using these integer IDs 129. The integer sequences 128 are used in subsequent modeling.

In block 218, the wrap-up system 100 builds a predictive note model using the predictive note model component 170. In one embodiment, the predictive note model is a sequence-to-sequence model. In various embodiments, the sequence-to-sequence model may include an encoder-decoder with attention model or a BERT text summarization with a pre-trained encoder (also known as a pre-trained BERTSUM or PreSumm).

In optional block 220, the wrap-up system 100 uses the interaction processing component 120 to run a parameter tuning algorithm with parameter tuning component 132. Each predictive note model type disclosed has different parameters, which should be tuned to provide improved model training results. The system runs a parameter tuning algorithm to find the target set of parameters 133 and data to use in training the predictive note model(s).

In block 222, the predictive note model component 170 receives vector embeddings 151 and integer sequences 128 for the training data, including training transcripts 110 and training contact notes 111 and trains the predictive note model(s) optionally based on the target set of parameters 133.

In block 224, the interaction processing component 120 receives communication data from the interaction database 102 or in real-time from the customer engagement center system and generates and cleans the communication transcript 114 from the communication recording 113 associated with the communication data. The communication data is an interaction between an agent and a customer. The communication data may be from a completed or ongoing interaction. The method encompassed by blocks 204, 206, 208, and 216 is used to generate and process the communication transcript 114.

In block 226, predictive note model component 170 receives the integer sequences for the communication transcript 114 and runs the trained predictive note model to generate a contact note for the communication transcript 114.

In block 228, a wrap-up assignment component 195 receives the contact data including the communication recording 113 and the communication transcript 114 and receives the contact note associated with the communication transcript 114 generated by the predictive note model.

In optional block 230, the wrap-up assignment component 195 displays the communication transcript 114 and the generated contact note on a user device 160 to a customer service representative or other user for approval of the contact note or editing of the contact note.

In block 232, the wrap-up assignment component 195 assigns the generated contact note to the communication data associated with the communication transcript 114. If optional block 230 is used, the assignment of the contact note to the communication data is based on the user's approval and/or edits or corrections. If optional block 230 is not used, the assignment of the contact note to the communication data is automatic and a direct assignment of the contact note generated by the predictive note model component.

In block 234, the wrap-up system stores the contact notes with the associated communication data in a wrap-up database 162 and/or the storage component 190.

Figure 3A:
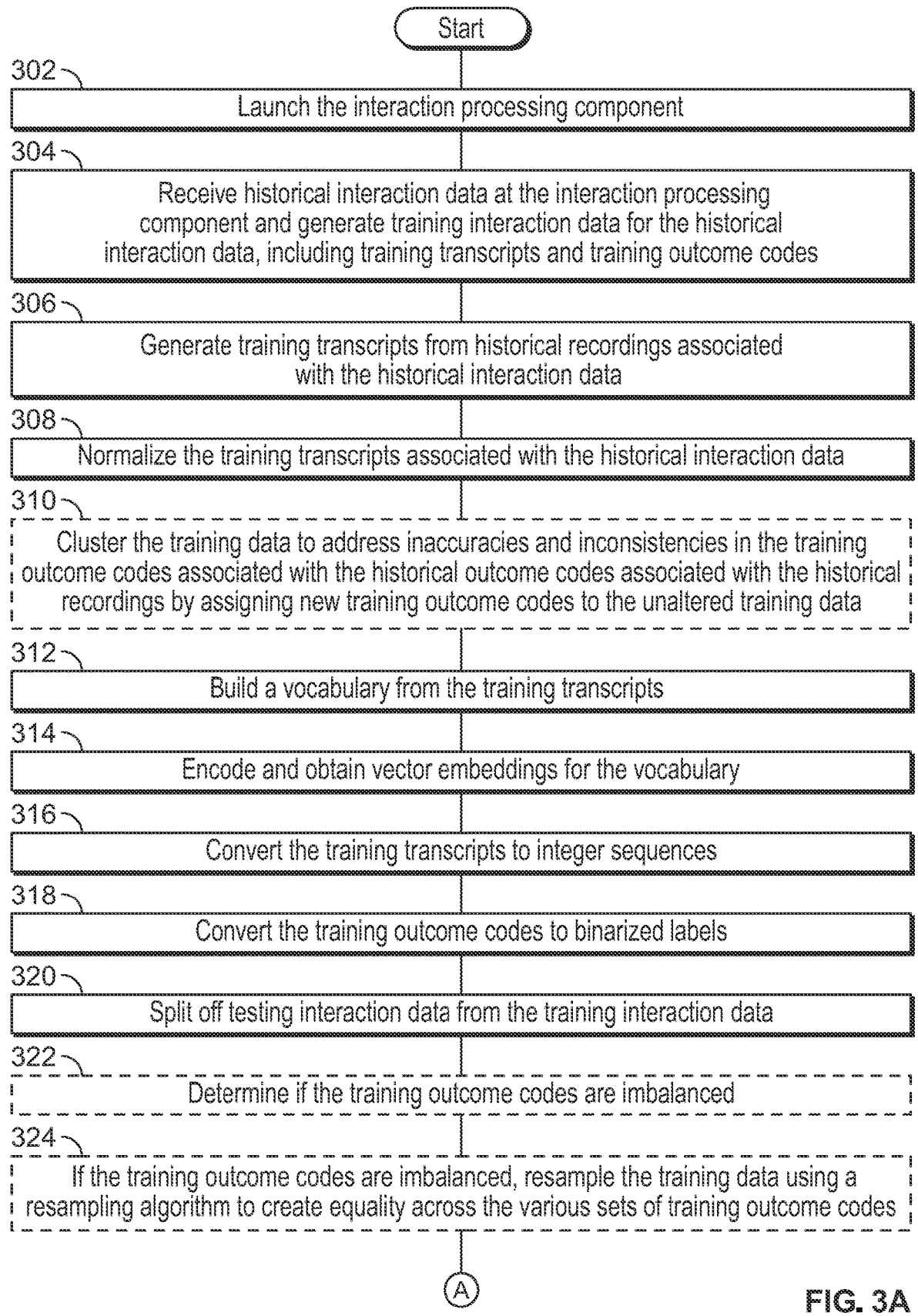
FIGS. 3A and 3B depict a flowchart of an example of a method for auto-generating outcome codes for an interaction, according to certain embodiments.
Figure 3B:
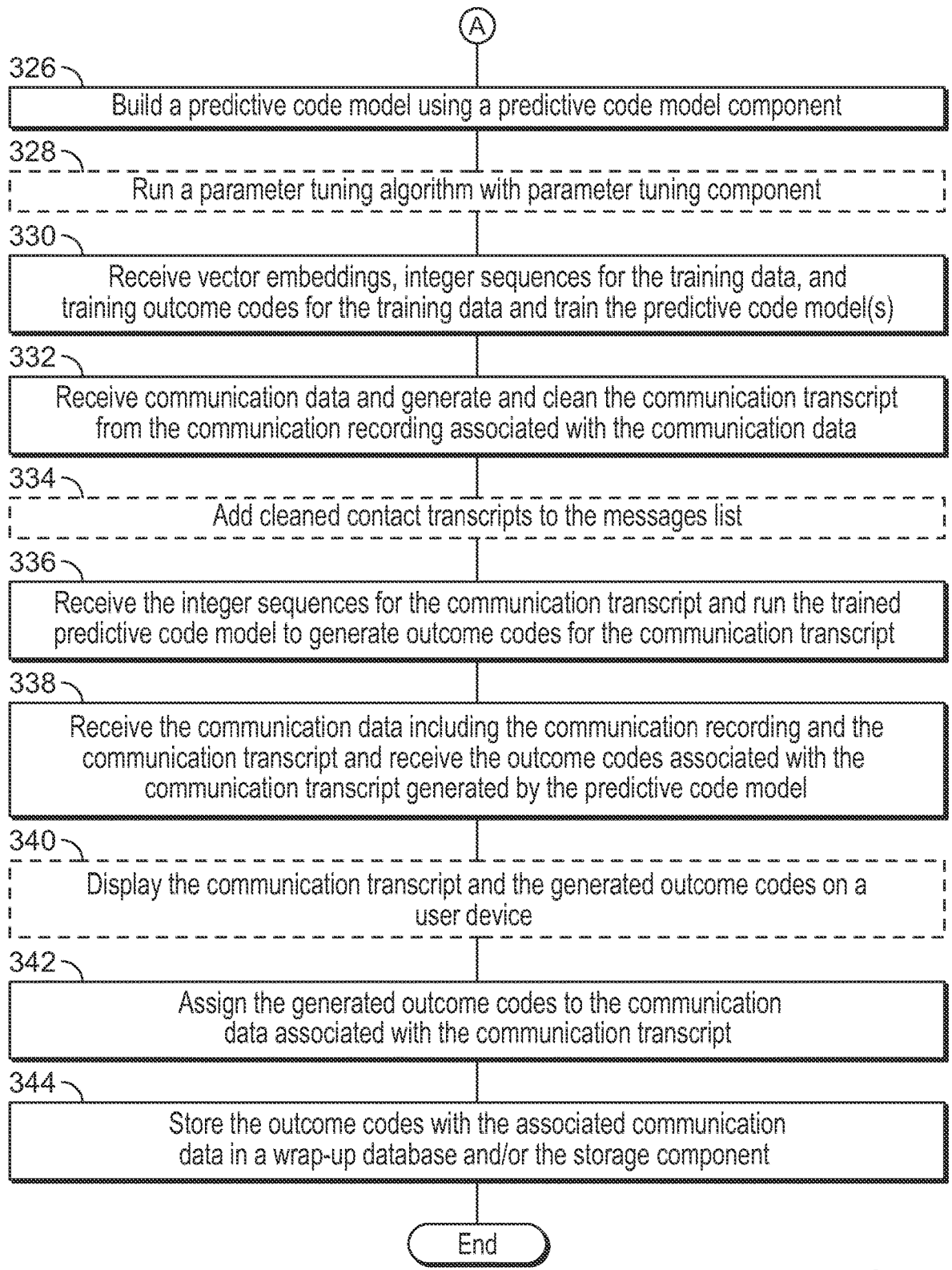

FIGS. 3A and 3B show a flowchart of an example of a method 300 for auto-generating outcome codes for an interaction. Blocks 302 through 324 form the data preprocessing blocks. Blocks 326 through 330 form the training blocks. Block 332 through 344 form the model application blocks. The numbering and sequencing of the blocks are for reference only; blocks or sequences of blocks may be performed out of order or repeated.

In block 302, the wrap-up system 100 launches the interaction processing component 120. The interaction processing component 120 is launched before or simultaneously with when the historical interaction data 104 is received.

In block 304, the interaction processing component 120 receives the historical interaction data 104 from an interaction database 102 or in real-time form the customer engagement center system and generates training interaction data for the historical interaction data 104 including training transcripts 110 and training outcome codes 112.

In block 306, the interaction processing component 120 uses a transcription component 121 and generates training transcripts from the historical recordings 105 associated with the historical interaction data 104. In certain embodiments, the transcription component 121 may segment the historical recordings 105 into a series of utterances, which are segments of audio data that are likely to be speech separated by segments of audio data that are likely to be non-speech segments such as silence or non-speech noise that exceed a threshold amount of time, for example, 3 seconds. In certain embodiments, the LVCSR may be specialized for words, phrases, and terms in a specific industry, technical, or scientific field, specific to a language or a dialect, or expected in the historical interaction data 104 to ensure that the proper terms and interpretations are prioritized. In an embodiment, the generated training transcripts 110 may be generated from historical interaction data 104 received in real-time or from historical interaction data 104 from a certain timeframe, locale, or other desired parameter or parameters.

In block 308, the interaction processing component 120 normalizes the training transcripts 110 using a normalizing component 122. In an embodiment, the normalizing component 122 removes punctuation and markups in the training transcripts 110 to create a standard transcript format.

In optional block 310, the interaction processing component 120 uses a clustering component 124 to cluster the training data to address inaccuracies and inconsistencies in the training outcome codes 112 associated with the historical outcome codes 107 associated with the historical recordings 105 by assigning new training outcome codes 112 to the unaltered training data. Clustering the training data will identify outcome codes and examine performance across the outcome codes. The determination to cluster the data and assign new training outcome codes may be made manually by a user or by the system if a threshold is exceeded.

In block 312, the interaction processing component 120, using a vocabulary component 125, builds a vocabulary 126 from the training transcripts 110. In certain embodiments, the vocabulary component 125 uses a tokenizer to build the vocabulary 126 to cover the most used words in the training transcripts 110.

In block 314, the interaction processing component 120 to encode and obtain vector embeddings 151 for the vocabulary 126. The language preprocessor transforms the vocabulary 126 into vector embeddings 151. In an embodiment, the language preprocessor may be a Bidirectional Encoder Representations from Transformers (BERT). In another embodiment, the language preprocessor may be BERT-as-service, run either locally or remotely. In another embodiment, the BERT-as-service may be run on a graphics processing unit (GPU) capable of running the TensorFlow open-source software library.

In block 316, the interaction processing component 120, using an integer conversion component 127, converts the training transcripts 110 to integer sequences 128. Each word in the vocabulary 126 is assigned an integer ID 129 and the integer conversion component 127 converts the text of the training transcripts 110 to integer sequences 128 using these integer IDs 129. The integer sequences 128 are used in subsequent modeling.

In block 318, the interaction processing component 120 converts the training outcome codes 112 to binarized labels 131 using the binarizing component 130. The binarizing component 130 converts the training outcome codes 112 associated with a training transcript 110 to a binary representation the model can process. In certain embodiments, the binarizing component 130 is a multilabel binarizer.

In block 320, the interaction processing component 120, using a division component 123, splits off testing interaction data 117 from the training interaction data. In an embodiment, to ensure the final trained model(s) appropriately generalize to unseen cases, the interaction processing component 120 splits off testing interaction data 117, including training transcripts 110 and training outcome codes 112. The model will not be given the testing interaction data 117 during training. Instead, the testing interaction data 117 can be used later to evaluate the performance of the model(s).

In optional block 322, the interaction processing component 120 uses the imbalance component 134 to determine if the training outcome codes 112 are imbalanced. If some outcome codes (also known as labels) are assigned in the set of training outcome codes 112 significantly more than others, then the model may become biased towards these. To prevent this, the system will compare the distribution of training outcome codes 112 to a predetermined balance threshold to determine if the data is imbalanced. In one embodiment, a training outcome code 112 is imbalanced if it has a mean imbalance ratio greater than 1.5 and a coefficient of variation of an imbalance ratio per outcome code greater than 0.2. In other embodiments, the predetermined balance threshold is specific to the system, the model, or the intended industry. If the data is imbalanced, the interaction processing component 120 will perform resampling as described in blocks 324 and 326 to balance the distribution of outcome codes.

In optional block 324, if the training outcome codes 112 are imbalanced, the interaction processing component 120 uses a resampling component 135 to resample the training data using a resampling algorithm to create equality across the various sets of training outcome codes 112. In an embodiment, the resampling algorithm is Label Powerset Random Undersampling (LP-RUS), Label Powerset Random Oversampling (LP-ROS), Multilabel Random Undersampling (ML-RUS), and/or Multilabel Random Oversampling (ML-ROS) algorithms. The RUS and ROS algorithms determine how to resample by considering the outcome code sets of the dataset, with RUS algorithms eliminating instances that appear more frequently in the training outcome code sets and ROS algorithms replicating instances that appear less frequently in the training outcome code sets to create equality across training outcome code sets. Such algorithms can be used in various combinations to create multiple outcome code sets, which may train multiple models. Blocks 322 and 324 may be repleaded until the training outcome codes 112 are balanced. This relabeled training data may then be used in subsequent blocks of the method 300.

In block 326, the wrap-up system 100 builds a predictive code model using the predictive code model component 180. In one embodiment, the predictive code model used is a deep learning model or a statistical model. In various embodiments, the deep learning model is a Recurrent Neural Network (RNN) based model or a Transformer based model. In an embodiment, the statistical model utilizes a Multi-Label K-Nearest Neighbor (ML-KNN) algorithm.

In optional block 328, the wrap-up system 100 uses the interaction processing component 120 to run a parameter tuning algorithm with a parameter tuning component 132. Each predictive code model type disclosed has different parameters, which should be tuned to provide improved model training results. The system runs a parameter tuning algorithm to find the target set of parameters 133 and data to use in training the predictive code model(s). The data for the target set of parameters 133 can be selected from unaltered, resampled, relabeled, or resampled and relabeled data sets generated by the previous blocks.

In block 330, the predictive code model component 180 receives vector embeddings 151, integer sequences 128 for the training data and training outcome codes 112 for the training data (the training data may be unaltered, resampled, relabeled, or resampled and relabeled) and trains the predictive code model(s) optional based on the target set of parameters 133.

In block 332, the interaction processing component 120 receives communication data from the interaction database 102 or in real-time from the customer engagement center system and generates and cleans the communication transcript 114 from the communication recording 113 associated with the communication data from an interaction. The communication transcript 114 may be from a completed or ongoing interaction. The method encompassed by blocks 306, 308, and 316 is used to process the communication transcript 114.

In optional block 334, the interaction processing component 120 utilizes a message component 138 to add cleaned contact transcripts 114 to the messages list 139. This block builds a message list 139 to be passed to the predictive code model.

In block 336, the predictive code model component 180 receives the integer sequences 128 for the communication transcript 114 and runs the trained predictive code model to generate outcome codes for the communication transcript 114.

In block 338, a wrap-up assignment component 195 receives the communication data including the communication recording 113 and the communication transcript 114 and receives the outcome codes associated with the communication transcript 114 generated by the predictive code model.

In optional block 340, the wrap-up assignment component 195 displays the communication transcript 114 and the generated outcome codes on a user device 160 to a customer service representative or other user for approval of the outcome codes or editing of the outcome codes. Editing of the outcome codes may include deletion of a suggested outcome code.

It should be understood that for blocks 332-340 the wrap-up system 100 does not necessarily wait for the interaction to be completed prior receiving and processing the communication data and generating and presenting predicted outcome codes. The wrap-up system 100 may receive communication data in real time and periodically engage the predictive code model throughout the interaction. The wrap-up system 100 may further present the generated outcome codes on the user device periodically and in real-time as they are generated.

In block 342, the wrap-up assignment component 195 assigns the generated outcome codes to the communication data associated with the communication transcript 114. If optional block 340 is used, the assignment of the outcome codes to the communication data is based on the user's approval and/or edits or corrections. If optional block 340 is not used, the assignment of the outcome codes to the communication data is automatic and a direct assignment of the outcome codes generated by the predictive code model component 180.

In block 344, the wrap-up system 100 stores the assigned outcome codes with the associated communication data in a wrap-up database 162 and/or the storage component 190.

Figure 4A:
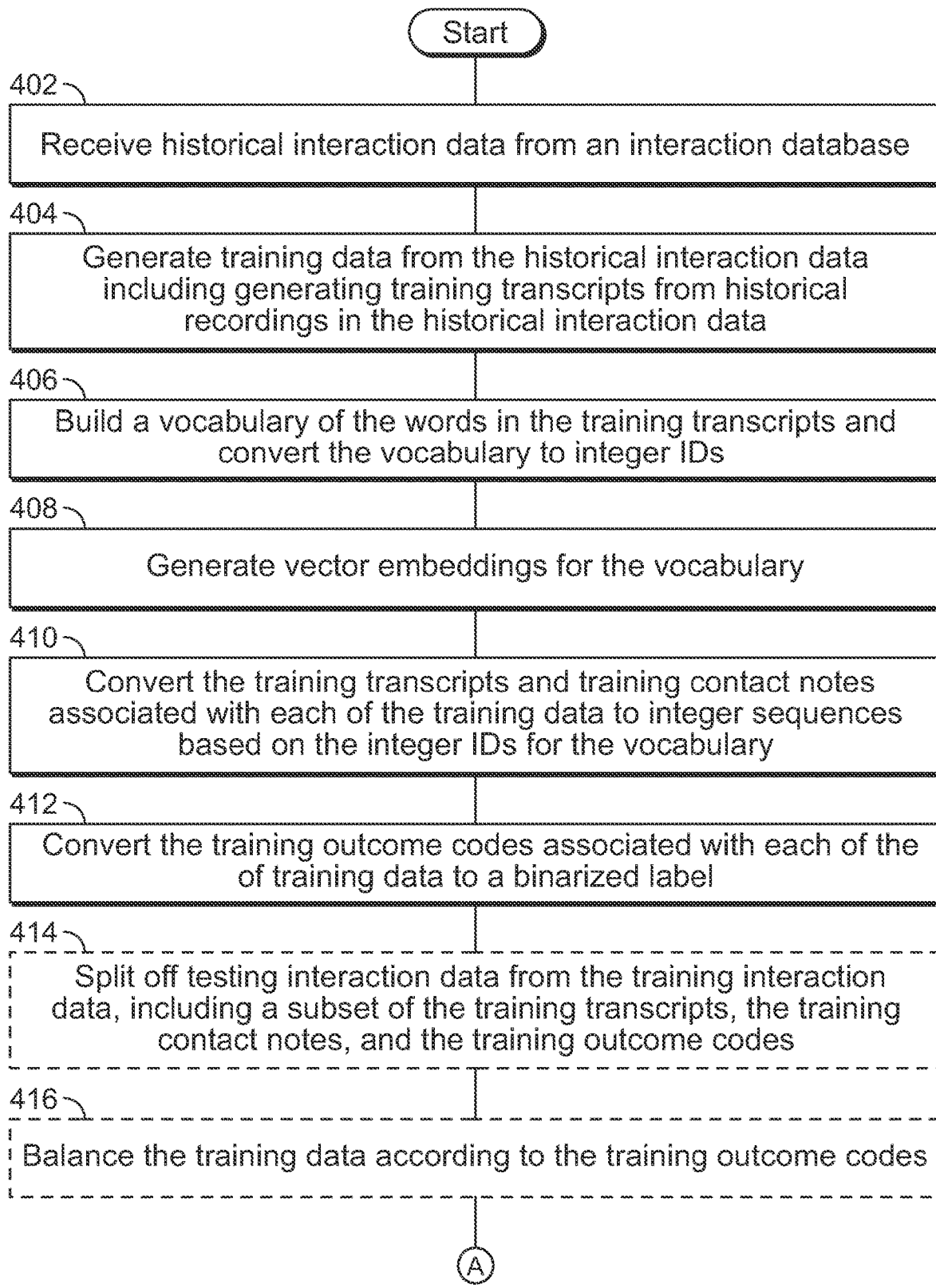
FIGS. 4A and 4B depict a flowchart of an example of a method for auto-generating wrap up information for an interaction, according to certain embodiments.
Figure 4B:
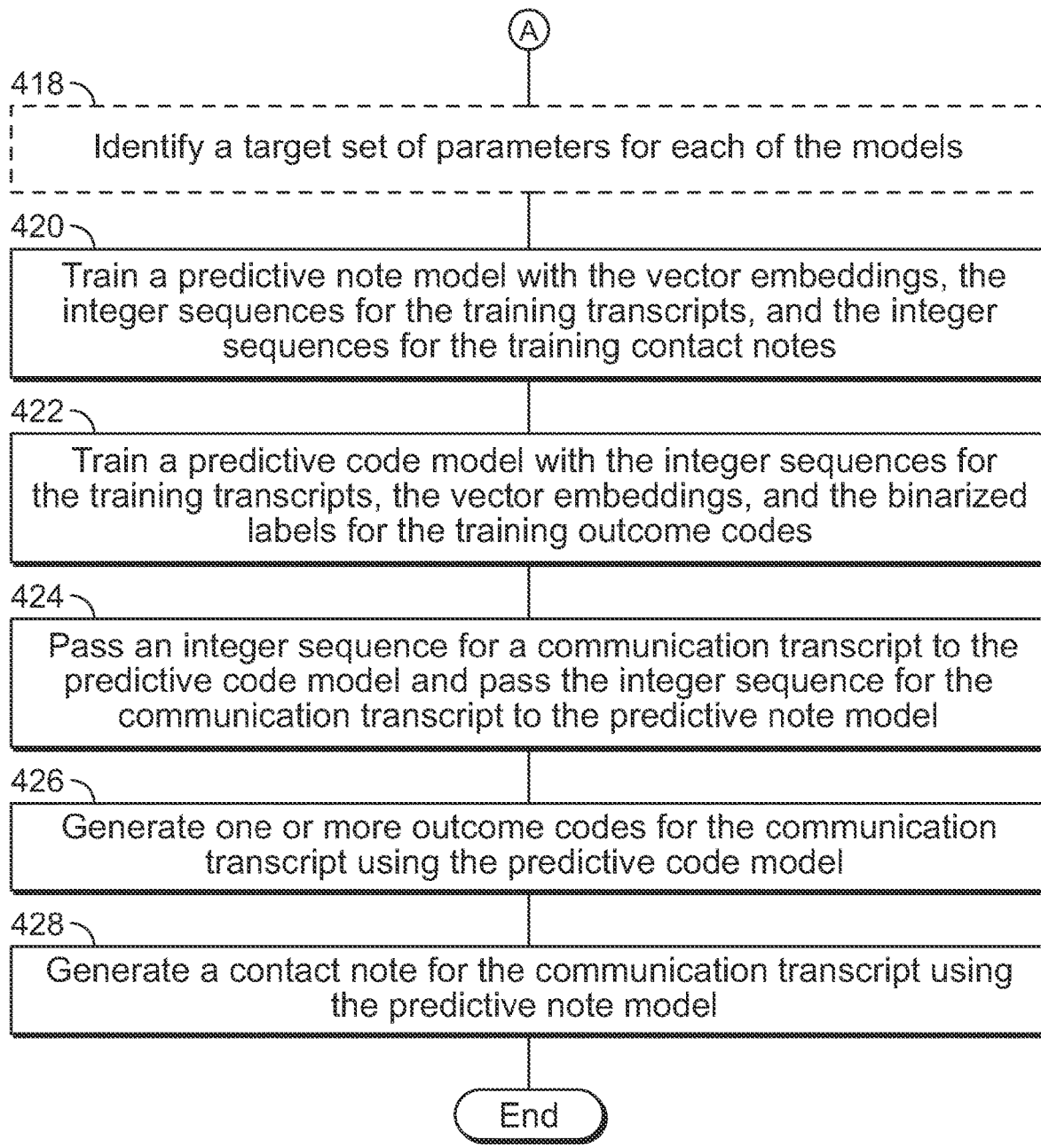

FIGS. 4A and 4B depict a flowchart of an example of a method for auto-generating wrap up information for an interaction, including training a predictive note model to generate contact notes for an interaction and training a predictive code model to generate outcome codes for an interaction, according to certain embodiments. The numbering and sequencing of the blocks are for reference only; blocks or sequences of blocks may be performed out of order or repeated.

In block 402, the wrap-up system 100 at an interaction processing component 120 receives historical interaction data 104 from an interaction database 102. In an embodiment the historical interaction data 104 may be received in real-time from the customer engagement center system and/or from the interaction database 102. In an embodiment, the historical interaction data 104 is a set of interactions between customers and customer service agents with each historical interaction data 104 including a historical recording 105, historical contact notes 106, and one or more historical outcome codes.

In block 404, the interaction processing component 120 generates training data from the historical interaction data 104 including generating training transcripts 110 from historical recordings 105 in the historical interaction data 104. The interaction processing component 120 may use a transcription component 121 to generate the training transcripts 110. In addition to generating training transcripts 110, the interaction processing component 120 may rename the received historical recording 105 as training recordings, historical contact notes 106 as training contact notes 111, and historical outcome codes 107 as training outcome codes 112.

In block 406, the interaction processing component 120 builds a vocabulary 126 of the words in the training transcripts 110 and convert the vocabulary 126 to integer IDs 129. In an embodiment, the interaction processing component 120 uses the words of the training contact notes 111 to also build the vocabulary 126. The interaction processing component 120 may use a vocabulary component 125 and a language preprocessor 150 to construct the vocabulary 126 and integer IDs 129. The interaction processing component 120 may use a normalizing component to first clean and normalize the training transcripts 110 and the training contact notes 111 prior to building the vocabulary 126.

In block 408, the interaction processing component 120 uses the language preprocessor 150 to generate vector embeddings 151 for the vocabulary 126.

In block 410, the interaction processing component 120 uses an integer conversion component 127 to convert the training transcripts 110 and training contact notes 111 associated with each of the training data to integer sequences 128 based on the integer IDs 129 for the vocabulary 126.

In block 412, the interaction processing component 120 uses a binarizing component 130 to convert the training outcome codes 112 associated with each of the training data to a binarized label 131.

In optional block 414, the interaction processing component 120 uses a division component 123 to split off testing interaction data 117 from the training interaction data, including a subset of the training transcripts 110, the training contact notes 111, and the training outcome codes 112. The testing interaction data 117 is not used in training the models but is used to test the accuracy of the training of the models.

In optional block 416, the interaction processing component 120 uses a clustering component 124, an imbalance component 134, and a resampling component 135 to balance the training data according to the training outcome codes 112.

In optional block 418, the interaction processing component 120 uses a parameter tuning component 132 to identify a target set of parameters 133 for each of the models.

In block 420, a predictive note model component 170 trains a predictive note model with the vector embeddings 151, the integer sequences 128 for the training transcripts 110, and the integer sequences 128 for the training contact notes 111. Once trained the predictive note model can receive a communication transcript 114 (e.g., the transcript for a "new" interaction) and generate a contact note for the communication transcript 114.

In block 422, a predictive code model component 180 trains a predictive code model with the integer sequences 128 for the training transcripts 110, the vector embeddings 151, and the binarized labels 131 for the training outcome codes 112. Once trained the predictive code model can receive a communication transcript 114 (e.g., the transcript for a "new" interaction) and generate one or more outcome codes for the communication transcript 114.

In block 424, the predictive code model component 180 passes an integer sequence 128 for a communication transcript 114 to the predictive code model and the predictive note model component 170 passes the integer sequence 128 for the communication transcript 114 to the predictive note model. In an embodiment, the integer sequence 128 for the communication transcript 114 is generated by the interaction processing component 120 using the above-described blocks for generating and processing the training transcripts 110.

In block 426, the predictive code model component 180 generates one or more outcome codes for the communication transcript 114 using the predictive code model.

In block 428, the predictive note model component 170 generates a contact note for the communication transcript 114 using the predictive note model.

Figure 5:
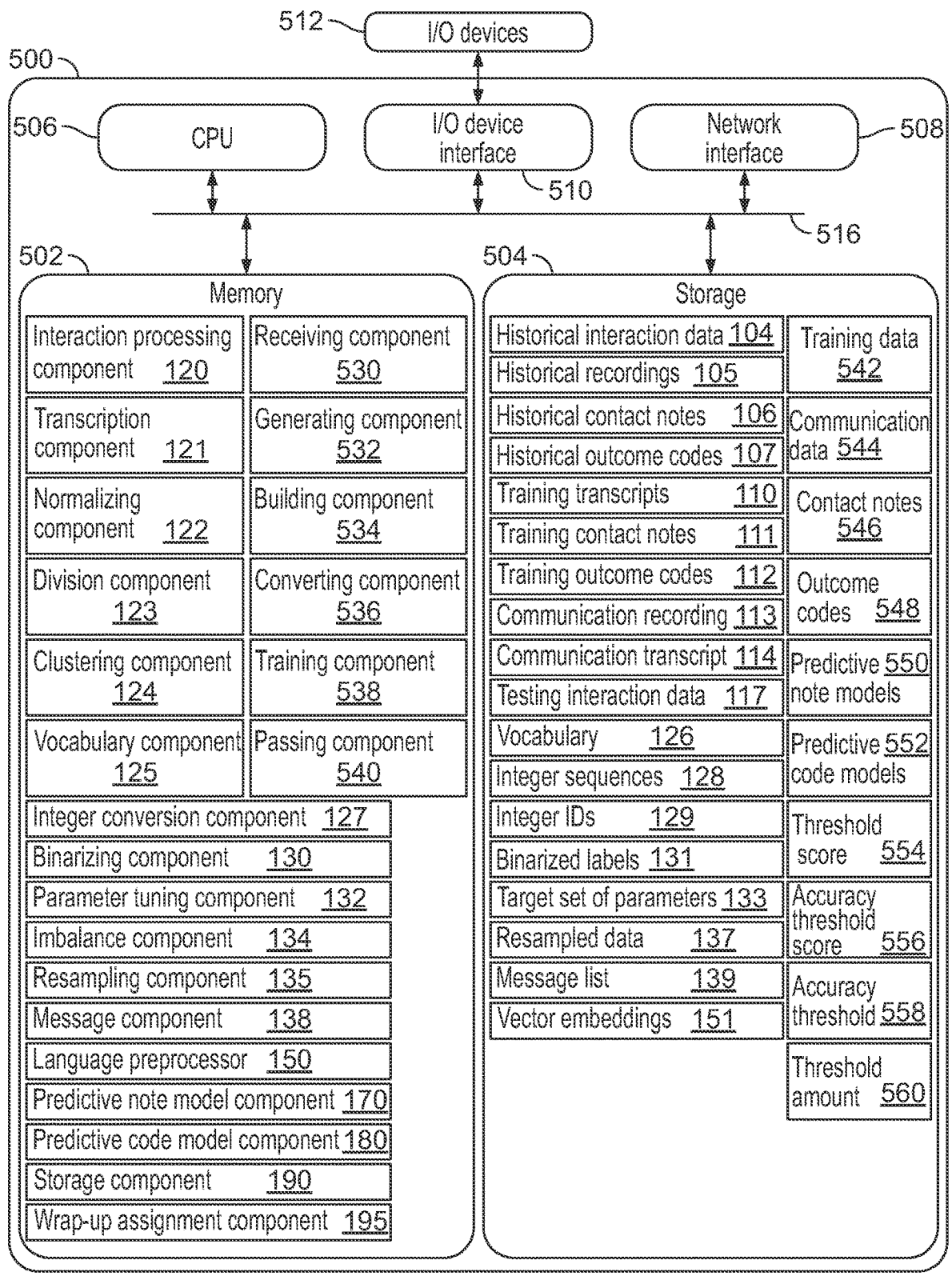
FIG. 5 depicts an example diagram of a computer system that may be utilized to implement the auto-generation of wrap-up information for an interaction in accordance with the disclosure, according to certain embodiments.

FIG. 5 depicts an example diagram of a computer system 500 that may include the kinds of software programs, data stores, hardware, and interfaces that can implement a wrap-up system 100 as disclosed herein and according to certain embodiments. The computing system 500 may be used to implement embodiments of portions of the wrap-up system 100 or in carrying out embodiments of method 200, method 300, and/or method 400. The computing system 700 may be part of or connected to an overarching customer service center system.

As shown, the computer system 500 includes, without limitation, a memory 502, a storage 504, a central processing unit (CPU) 506, and a network interface 508, each connected to a bus 516. The computing system 500 may also include an input/output (I/O) device interface 510 connecting I/O devices 512 (e.g., keyboard, display, and mouse devices) and/or a network interface 508 to the computing system 500. Further, the computing elements shown in computer system 500 may correspond to a physical computing system (e.g., a system in a data center), a virtual computing instance executing within a computing cloud, and/or several physical computing systems located in several physical locations connected through any combination of networks and/or computing clouds.

Computing system 500 is a specialized system specifically designed to perform the steps and actions necessary to execute methods 200, 300, and 400 and wrap-up system 100. While some of the component options for computing system 500 may include components prevalent in other computing systems, computing system 500 is a specialized computing system specifically capable of performing the steps and processes described herein.

The CPU 506 retrieves, loads, and executes programming instructions stored in memory 502. The bus 516 is used to transmit programming instructions and application data between the CPU 506, I/O interface 510, network interface 508, and memory 502. Note, the CPU 506 can comprise a microprocessor and other circuitry that retrieves and executes programming instructions from memory 502. CPU 506 can be implemented within a single processing element (which may include multiple processing cores) but can also be distributed across multiple processing elements (with or without multiple processing cores) or sub-systems that cooperate in existing program instructions. Examples of CPUs 506 include central processing units, application-specific processors, and logic devices, as well as any other type of processing device, a combination of processing devices, or variations thereof. While there are a number of processing devices available to compromise the CPU 506, the processing devices used for the CPU 506 are particular to this system and are specifically capable of performing the processing necessary to execute methods 200, 300, and 400 and wrap-up system 100.

The memory 502 can comprise any memory media readable by CPU 506 that is capable of storing programming instructions and able to meet the needs of the computing system 500 and execute the programming instructions required for methods 200, 300, and 400 and wrap-up system 100. Memory 502 is generally included to be representative of a random-access memory. In addition, memory 502 may include volatile and non-volatile, removable, and non-removable media implemented in any method or technology for storage of information, such as computer-readable instructions or program components. The memory 502 may be implemented as a single memory device but may also be implemented across multiple memory devices or sub-systems. The memory 502 can further include additional elements, such as a controller capable of communicating with the CPU 506.

Illustratively, the memory includes multiple sets of programming instructions for performing the functions of the wrap-up system 100 and methods 200, 300, and 400, including, but not limited to, interaction processing component 120, transcription component 121, normalizing component 122, division component 123, clustering component 124, vocabulary component 125, integer conversion component 127, binarizing component 130, parameter tuning component 132, imbalance component 134, resampling component 135, message component 138, language preprocessor 150, predictive note model component 170, predictive code model component 180, storage component 190, and wrap-up assignment component 195, all of which are discussed in greater detail herein. Illustratively, the memory may also include a receiving component 530, a generating component 532, a building component 534, a converting component 536, a training component 538, and a passing component 540. Although memory 502, as depicted in FIG. 5 includes twenty-three sets of programming instruction components in the present example, it should be understood that one or more components could perform single- or multi-component functions. It is also contemplated that these components of computing system 500 may be operating in a number of physical locations.

The storage 504 can comprise any storage media readable by CPU 506 and is capable of storing data that is able to meet the needs of computing system 500 and store the data required for methods 200, 300, and 400 and wrap-up system 100. The storage 504 may be a disk drive or flash storage device. The storage 504 may include volatile and non-volatile, removable, and non-removable media implemented in any method or technology for storage of information. Although shown as a single unit, the storage 504 may be a combination of fixed and/or removable storage devices, such as fixed disc drives, removable memory cards, optical storage, network-attached storage (NAS), or a storage area-network (SAN). The storage 504 can further include additional elements, such as a controller capable of communicating with the CPU 506.

Illustratively, the storage 504 may store data such as but not limited to historical interaction data 104, historical recordings 105, historical contact notes 106, historical outcome codes, training transcripts 110, training contact notes 111, training outcome codes 112, communication recordings 113, communication transcripts 114, testing interaction data 117, vocabulary 126, integer sequences 128, integer IDs 129, binarized labels 131, target set of parameters 133, resampled data 137, message list 139, vector embeddings 151, training data 542, communication data 544, contact notes 546, outcome codes 548, predictive note models 550, predictive code models 552, threshold score 554, accuracy threshold score 556, accuracy threshold 558, and threshold amount 560, all of which are also discussed in greater detail herein.

Examples of memory and storage media include random access memory, read-only memory, magnetic discs, optical discs, flash memory, virtual memory, and non-virtual memory, magnetic sets, magnetic tape, magnetic disc storage, or other magnetic storage devices, or any other medium which can be used to store the desired software components or information that may be accessed by an instruction execution system, as well as any combination or variation thereof, or any other type of storage medium. In some implementations, one or both of the memory and storage media can be a non-transitory memory and storage media. In some implementations, at least a portion of the memory and storage media may be transitory. Memory and storage media may be incorporated into computing system 500. While many types of memory and storage media may be incorporated into computing system 500, the memory and storage media used is capable of executing the storage requirements of methods 200, 300, and 400 and wrap-up system 100 as described herein.

The I/O interface 510 allows computing system 500 to interface with I/O devices 512. I/O devices 512 can include one or more user devices 160, graphical user interfaces, desktops, a mouse, a keyboard, a voice input device, a touch input device for receiving a gesture from a user, a motion input device for detecting non-touch gestures and other motions by a user, and other comparable I/O devices and associated processing elements capable of receiving input. The I/O devices 512 through the user devices 160 are also integrated into the customer service center system, telephone system, internet system, and a text communications system, among other systems. I/O devices 512 can also include devices such as a video display or graphical display and other comparable I/O devices and associated processing elements capable of providing output. Speakers, printers, haptic devices, or other types of output devices may also be included in the I/O device 512.

A user can communicate with computing system 500 through the I/O device 512 in order to view historical interaction data 104, historical recordings 105, historical contact notes 106, historical outcome codes, training transcripts 110, training contact notes 111, training outcome codes 112, communication recordings 113, communication transcripts 114, testing interaction data 117, vocabulary 126, integer sequences 128, integer IDs 129, binarized labels 131, target set of parameters 133, resampled data 137, message list 139, vector embeddings 151, training data 542, communication data 544, contact notes 546, outcome codes 548, predictive note models 550, predictive code models 552, threshold score 554, accuracy threshold score 556, accuracy threshold 558, and threshold amount 560 or complete any number of other tasks the user may want to complete with computing system 500. I/O devices 512 can receive and output data such as but not limited to historical interaction data 104, historical recordings 105, historical contact notes 106, historical outcome codes, training transcripts 110, training contact notes 111, training outcome codes 112, communication recordings 113, communication transcripts 114, testing interaction data 117, vocabulary 126, integer sequences 128, integer IDs 129, binarized labels 131, target set of parameters 133, resampled data 137, message list 139, vector embeddings 151, training data 542, communication data 544, contact notes 546, outcome codes 548, predictive note models 550, predictive code models 552, threshold score 554, accuracy threshold score 556, accuracy threshold 558, and threshold amount 560.

As described in further detail herein, computing system 500 may receive and transmit data from and to the network interface 508. In embodiments, the network interface 508 operates to send and/or receive data, such as but not limited to, historical interaction data 104, historical recordings 105, historical contact notes 106, historical outcome codes, training transcripts 110, training contact notes 111, training outcome codes 112, communication recordings 113, communication transcripts 114, testing interaction data 117, vocabulary 126, integer sequences 128, integer IDs 129, binarized labels 131, target set of parameters 133, resampled data 137, message list 139, vector embeddings 151, training data 542, communication data 544, contact notes 546, outcome codes 548, predictive note models 550, predictive code models 552, threshold score 554, accuracy threshold score 556, accuracy threshold 558, and threshold amount 560 to/from other devices and/or systems to which computing system 500 is communicatively connected, and to receive and process interactions as described in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems, and method steps. It is to be expected that various equivalents, alternatives, and modifications are possible within the scope of the foregoing description.

What is claimed is:

1. A method for generating wrap up information, comprising:
    receiving, by a processor, a set of historical interaction data from an interaction database, wherein each historical interaction data includes an interaction recording, contact notes associated with the interaction recording, and one or more outcome codes associated with the interaction recording;
    generating, by the processor a set of training data from the set of historical interaction data including transforming the interaction recording associated with each historical interaction data into a training transcript, including using the processor to segment the interaction recording into utterances and using natural language processing on the segments to generate the training transcripts;
    constructing, by the processor, a vocabulary of words based on the training transcripts;
    converting, by the processor the training transcripts and training-contact notes associated with each historical interaction data to integer sequences based on the vocabulary of words;
    converting, by the processor the outcome codes associated with each of historical interaction data to a binarized label;
    generating, by the processor, a predictive note model using a transformer deep leaning model to encode the integer sequences for the training transcripts and the integer sequences for the contact notes to produce encoded note data and training the predictive note model on the encoded note data, wherein the predictive note model is a sequence-to-sequence model, further wherein the predictive note model generates communication contact notes for new communications;
    generating, by the processor, a predictive code model using a transformer deep learning model to encode the integer sequences for the training transcripts, the vocabulary, and the binarized labels for the outcome codes to produce encoded code data and training the predictive code model on the encoded code data, wherein the predictive code model is one of a deep leaning model or a statistical model, further wherein the predictive code model assigns communication outcome codes to new communications;
    receiving a new communication and using the trained predictive note model to generate the communication contact note for the new communication; and
    generating, for the new communication, using the trained predictive code model, the outcome codes for the new communication.

2. The method of claim 1, further comprising generating vector embeddings for the vocabulary to encode the vocabulary using a language preprocessor.

3. The method of claim 1, further comprising determining if the outcome codes are imbalanced by comparing a distribution of the outcome codes to a predetermined balance threshold.

4. The method of claim 3, further comprising resampling the outcome codes from the historical interaction data with at least one resampling algorithm when the outcome codes are imbalanced.

5. The method of claim 4, wherein the at least one resampling algorithm is one of a Label Powerset Random Undersampling (LP-RUS) algorithm, a Label Powerset Random Oversampling (LP-ROS) algorithm, a Multilabel Random Undersampling (ML-RUS) algorithm, or a Multilabel Random Oversampling (ML-ROS) algorithm.

6. The method of claim 1, wherein the historical interaction data is a data structure including fields for the interaction recording, the contact notes, and the outcome codes.

7. The method of claim 1, wherein the transformer deep learning model for the predictive code model is a recurrent neural network model or a transformer based model, further wherein the statistical model for the predictive code model is a multi-label k-nearest neighbor model.

8. A system for generating wrap up information, comprising:
    a memory comprising computer readable instructions; and
    a processor configured to read the computer readable instructions that when executed causes the system to:
        receive a set of historical interaction data from an interaction database, wherein each historical interaction data includes an interaction recording, contact notes associated with the interaction recording, and one or more outcome codes associated with the interaction recording;

generate a set of training data from the set of historical interaction data including transforming the interaction recording associated with each historical interaction data into a training transcript, including using the processor to segment the interaction recording into utterances and using natural language processing on the segments to generate the training transcripts;

construct a vocabulary of words based on the training transcripts;

convert the training transcripts and training-contact notes associated with each historical interaction data to integer sequences based on the vocabulary of words;

convert the outcome codes associated with each historical interaction data to a binarized label;

generate a predictive note model using a transformer deep leaning model to encode the integer sequences for the training transcripts and the integer sequences for the contact notes to produce encoded note data and training the predictive note model on the encoded note data, wherein the predictive note model is a sequence-to-sequence model, further when the predictive note model generate communication contact notes for new communications;

generate a predictive code model using a transformer deep learning model to encode the integer sequences for the training transcripts, the vocabulary, and the binarized labels for the outcome codes to produce encoded code data and training the predictive code model on the encoded code data, wherein the predictive code model is one of a deep leaning model or a statistical model, further wherein the predictive code model assigns communication outcome codes to new communications;

receive a new communication and use the trained predictive note model to generate the communication contact note for the new communication; and generate, for the new communication, using the trained predictive code model, the communication outcome codes for the new communication.

9. The system of claim 8, wherein the system is further caused to generate vector embeddings for the vocabulary to encode the vocabulary using a language preprocessor.

10. The system of claim 8, further including computer readable instructions that further cause the system to determine if the outcome codes are imbalanced by comparing a distribution of the outcome codes to a predetermined balance threshold.

11. The system of claim 10, further including computer readable instructions that further cause the system to resample the outcome codes from the historical interaction data with at least one resampling algorithm when the outcome codes are imbalanced.

12. The system of claim 11, wherein the at least one resampling algorithm is one of a Label Powerset Random Undersampling (LP-RUS) algorithm, a Label Powerset Random Oversampling (LP-ROS) algorithm, a Multilabel Random Undersampling (ML-RUS) algorithm, or a Multilabel Random Oversampling (ML-ROS) algorithm.

13. The system of claim 8, wherein the historical interaction data is a data structure including fields for the interaction recording, the contact notes, and the outcome codes.

14. The system of claim 8, wherein the transformer deep learning model for the predictive code model is a recurrent neural network mode or a transformer based model, further wherein the statistical model for the predictive code model is a multi-label k-nearest neighbor model.

15. A non-transitory computer readable medium comprising computer readable code to generate wrap up information on a system that when executed by a processor, causes the system to:

receive a set of historical interaction data from an interaction database, wherein each historical interaction data includes an interaction recording, contact notes associated with the interaction recording, and one or more outcome codes associated with the interaction recording;

generate a set of training data from the set of historical interaction data including transforming the interaction recording associated with each historical interaction data into a training transcript, including using the processor to segment the interaction recording into utterances and using natural language processing on the segments to generate the training transcripts;

construct a vocabulary of words based on the training transcripts;

convert the training transcripts and training-contact notes associated with each historical interaction data to integer sequences based on the vocabulary of words;

convert the outcome codes associated with each of historical interaction data to a binarized label;

generate a predictive note model using a transformer deep leaning model to encode the integer sequences for the training transcripts and the integer sequences for the contact notes to produce encoded note data and training the predictive note model on the encoded note data, wherein the predictive note model is a sequence-to-sequence model, further wherein the predictive note model generates communication contact notes for new communications;

generate a predictive code model using a transformer deep learning model to encode the integer sequences for the training transcripts, the vocabulary, and the binarized labels for the outcome codes to produce encoded code data and training the predictive code model on the encoded code data, wherein the predictive code model is one of a deep leaning model or a statistical model, further wherein the predictive code model assigns communication outcome codes to new communications;

receive a new communication and use the trained predictive note model to generate the communication contact note for the new communication; and generate, for the new communication, using the trained predictive code model, the outcome codes for the new communication.

16. The non-transitory computer readable medium of claim 15, further causing the system to generate vector embeddings for the vocabulary to encode the vocabulary using a language preprocessor.

17. The non-transitory computer readable medium of claim 15, further causing the system to determine if the outcome codes are imbalanced by comparing a distribution of the outcome codes to a predetermined balance threshold.

18. The non-transitory computer readable medium of claim 17, further causing the system to resample the outcome codes from the historical interaction data with at least one resampling algorithm when the outcome codes are imbalanced.

19. The non-transitory computer readable medium of claim 18, wherein the at least one resampling algorithm is one of a Label Powerset Random Undersampling (LP-RUS) algorithm, a Label Powerset Random Oversampling (LP-ROS) algorithm, a Multilabel Random Undersampling (ML-RUS) algorithm, or a Multilabel Random Oversampling (ML-ROS) algorithm.

20. The non-transitory computer readable medium of claim 15, wherein the transformer deep learning model for the predictive code model is a recurrent neural network model or a transformer based model, further wherein the statistical model for the predictive code model is a multi-label k-nearest neighbor model.

* * * * *